United States Patent [19]

Fujii et al.

[11] Patent Number: 4,540,856
[45] Date of Patent: Sep. 10, 1985

[54] REMOTE CONTROL SYSTEM

[75] Inventors: Teruo Fujii; Hiroshi Fukushima; Nobuo Nakai, all of Toyokawa, Japan

[73] Assignee: Hitachi, Ltd., Tokyo, Japan

[21] Appl. No.: 499,241

[22] Filed: May 31, 1983

[30] Foreign Application Priority Data

May 31, 1982 [JP] Japan .................................. 57-91252

[51] Int. Cl.³ ............................................ H04M 1/64
[52] U.S. Cl. ..................................... 179/89; 179/6.11; 179/6.1
[58] Field of Search ................. 179/89, 2 A, 6.11, 6.1, 179/6.07, 6.09, 18 B, 5 P, 81 R, 2 DP, 2 AS; 369/29

[56] References Cited

U.S. PATENT DOCUMENTS 4,122,306 10/1978 Friedman et al. ............ 179/6.11 X
4,306,117 12/1981 Jacobson ................. 179/6.1
4,320,256 3/1982 Freeman .......................... 179/2 AS
4,371,752 2/1983 Mathews et al. ............ 179/18 B X

OTHER PUBLICATIONS

LEXIS, Handbook, 1980, pp. 1-49.

Primary Examiner—James L. Dwyer
Attorney, Agent, or Firm—Antonelli, Terry & Wands

[57] ABSTRACT

A remote control system which is suitable for selective execution of any one of a plurality of functions of an automatic answering telephone apparatus by means of remote control over a telephone line. In the system, questioning speeches corresponding to the individual functions respectively are sequentially transmitted to the user of the apparatus, and the answer of the user to a specific question is detected to execute the specific function.

9 Claims, 5 Drawing Figures

REMOTE CONTROL SYSTEM

This invention relates to a remote control system which can effect remote control of an apparatus connected to a bidirectional communication line, such as a telephone line, and more particularly to a system of the kind above described which is suitable for selective execution of any one of a plurality of functions required for such an apparatus.

Automatic answering telephone devices include a type of device in which incoming messages transmitted and recorded while the user of the telephone apparatus is away can be played back so as to be heard by the user by remote control manipulation by the user. Such an apparatus is required to possess a plurality of functions including the function of changing the contents of the outgoing message of the user. A method of remote control by the use of a so-called tone key unit, which is a portable oscillator capable of transmitting predetermined frequency signals, has been frequently employed in this field of art. However, the number of buttons on the tone key unit increases with the increase in the number of required functions, resulting in such drawbacks as an increase in the complexity of manipulation and the large size of the unit. Further, it is a recent trend or demand to attain the desired remote control in response to the voice of the user. For this purpose, it is necessary to facilitate means for application of the remote control input and for selection of the timing of input application.

It is therefore an object of the present invention to provide a remote control system which can simply and easily provide remote control for the selection of a plurality of functions required for an automatic answering telephone apparatus.

Another object of the present invention is to provide a remote control system which makes it possible to attain remote control of such an apparatus in response to the voice of the user.

According to the present invention, a plurality of questioning speeches corresponding respectively to individual functions are sequentially transmitted from an automatic answering telephone apparatus, and the user of the apparatus answers these questions in some suitably way to specify that a function may or may not be selected.

The above and other objects, features and advantages of the present invention will be apparent from the following detailed description taken in connection with the accompanying drawings, in which.

Figure 1:
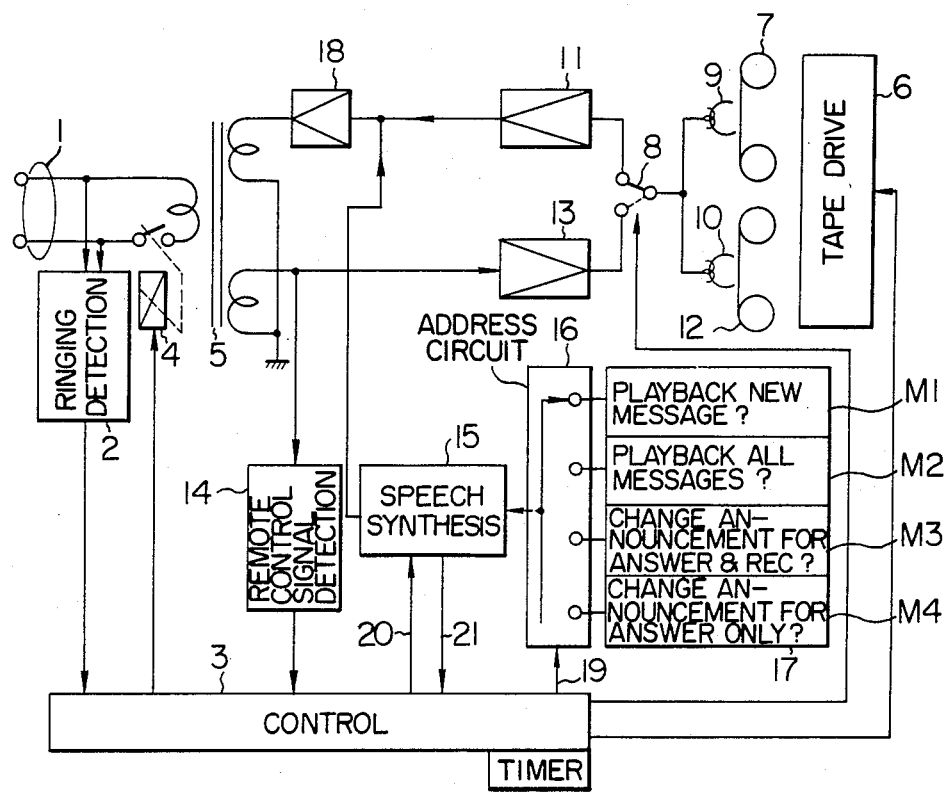
FIG. 1 is a block diagram of an embodiment of the present invention when applied to an automatic answering telephone apparatus.

An embodiment of the present invention will now be described in detail with reference to the drawings. FIG. 1 is a block diagram of an embodiment of the present invention when applied to an automatic answering telephone apparatus. The system shown in FIG. 1 includes a telephone circuit 1, a ringing tone signal detecting circuit 2, a control circuit 3, a relay 4, a coupling transformer 5, a tape drive circuit 6, an outgoing message tape 7, a switch 8, recording/reproducing heads 9, 10, a playback amplifier 11, an incoming message tape 12, a recording amplifier 13, a remote control signal detecting circuit 14, a speech synthesis circuit 15, an address circuit 16, a read-only memory (ROM) 17, and an amplifier 18.

The general system structure and operation of the automatic answering telephone apparatus to which the present invention is applied will be first described with reference to FIG. 1.

Upon arrival of a ringing tone signal over the telephone circuit 1, the ringing tone signal detecting circuit 2 detects the signal, and the control circuit (a sequencer) 3 is informed of the fact that the telephone apparatus is called. As soon as the control circuit 3 is informed of the above fact, the relay 4 is closed to connect the telephone circuit 1 to the coupling transformer 5 to permit signal transmission and reception. At the same time, the tape drive circuit 6 drives the outgoing message tape 7 having recorded thereon a message which tells the calling party of the fact that the user of the apparatus is absent, and the recording/reproducing switch 8 is switched over to its playback position shown by the solid line. Therefore, the outgoing message recorded on the outgoing message tape 7 is reproduced and transmitted to the calling party by the recording/reproducing head 9, playback amplifier 11, amplifier 18 and coupling transformer 5. The outgoing message is recorded on the outgoing message tape 7 which is an endless tape, and a foil of aluminum is bonded to the head of the outgoing message for the purpose of ready retrieval. Completion of transmission of the outgoing message is sensed by detection of this aluminum foil, and the control circuit 3 acts to stop the outgoing message tape 7. Then, the tape drive circuit 6 drives, under control of the control circuit 3, the incoming message tape 12 for recording an incoming message transmitted from the calling party, and the recording/reproducing switch 8 is switched over to the recording position shown by the broken line. The incoming message from the calling party is therefore recorded on the incoming message tape 12 through the coupling transformer 5, recording amplifier 13 and recording/reproducing head 10. Completion of the incoming message transmitted from the calling party is detected by means for detecting interruption of the calling party's speech or means for detecting a lapse of predetermined length of time, for example. Upon completion of recording of the incoming message transmitted from the calling party, the control circuit 3 acts to stop the incoming message tape 12 and open the relay 4 thereby completing one cycle of the automatic answering and recording function. In this manner, incoming messages transmitted from calling parties in the absence of the user of the apparatus are sequentially recorded on the incoming message tape 12. The structure and operation of such an automatic answering telephone apparatus are well known in the art.

The application of the remote control according to the present invention to such an automatic answering telephone apparatus will now be described.

In the embodiment of the remote control system of the present invention applied to the automatic answering telephone apparatus, four functions can be executed by remote control. According to the first function, incoming messages which have not yet been reproduced and thus which have not yet been heard by the user of the telephone apparatus, among those recorded already on the incoming message tape 12, can only be reproduced when so desired. According to the second function, all of the incoming messages recorded on the incoming message tape 12 can be reproduced. According to the third function, the outgoing message recorded already on the outgoing message tape 7 can be changed or renewed as desired, and, after reproduction of the new outgoing message, an incoming message transmitted from a calling party can be recorded on the incoming message tape 12 by switch-over of the recording/reproducing switch 8. The fourth function is an answer-only function according to which the outgoing message recorded already on the outgoing message tape 7 can be changed or renewed as desired, and the renewed outgoing message can only be reproduced. The remote control for the selection of these four functions must be made only by the authorized user of the telephone apparatus. Therefore, whether or not a person who tries to effect remote control of the telephone apparatus is the user himself of the telephone apparatus is checked prior to the procedure for execution of the functions. There is, for example, means for checking or identification in which a tone key unit is used.

The user of the telephone apparatus manipulates the tone key unit to transmit a predetermined remote control signal during reproducing of the outgoing message, or recording of an incoming message after reproduction of the outgoing message. The remote control signal detecting circuit 14 is adapted to detect only a predetermined remote control signal transmitted from a specific tone key unit to identify that the signal transmitter is the authorized user.

Figure 2:
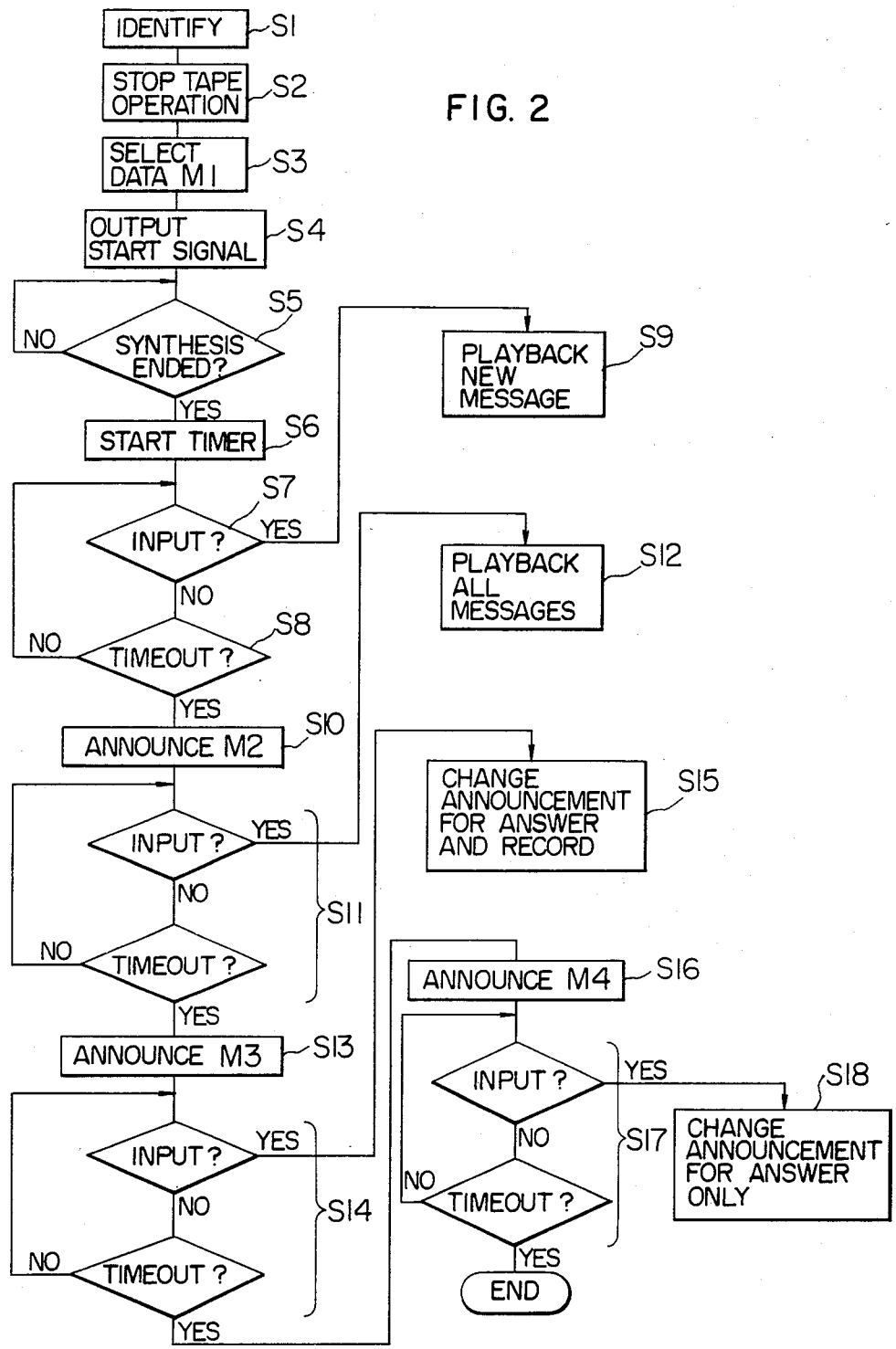
FIG. 2 is a flow chart showing how a plurality of functions of the apparatus shown in FIG. 1 are selected under remote control by the human voice.

FIG. 2 is a flow chart showing the steps of processing executed by the control circuit 3 after the person has been identified as the user himself of the telephone apparatus. After identification of the user in step S1, the type drive circuit 6, which drives the outgoing message tape 7 for reproduction of the outgoing message and the incoming message tape 12 for recording of incoming messages, is deenergized in step S2 under control of the control circuit 3. Then, in step S3, the control circuit 3 applies a start address signal to the address circuit 16 by way of a line 19, and the start address signal is preset in an address counter in the address circuit 16, so that data of a message M1 stored in the ROM 17 is selected on the basis of the address signal. The message M1 contains an expression, "Playback new message?", which is a question related to the function of reproducing a non-heard incoming message only among those transmitted and recorded already. Then, in step S4, the control circuit 3 applies a start signal to the speech synthesis circuit 15 by way of a line 20. The speech synthesis circuit 15 includes a clock generator therein. In response to the application of the start signal, the clock generator applies clock pulses to the address circuit 16 and the address counter in the address circuit 16 is incremented by the clock pulses from the clock generator, so that the data of the message M1 is sequentially read out from the ROM 17 to be synthesized into the speech signal in the speech synthesis circuit 15, and the speech signal is transmitted from the speech synthesis circuit 15 to the telephone circuit 1 through the amplifier 18 and coupling transformer 5. Such a technique of reading out speech information data from a ROM and synthesizing the data into a speech has already been put into practical use.

Then, in step S5, the control circuit 3 stands by until the speech is completely generated. The completion of the speech is detected by a specific signal indicative of the end of the speech information data. In response to the appearance of the specific signal read out from the ROM 17, the speech synthesis circuit 15 applies a stop signal to the control circuit 3 by way of a line 21. In response to the application of the stop signal to the control circuit 3, the step S5 is followed by step S6. In step S6, the control circuit 3 actuates a timer which sets the period of time during which the presence or absence of a remote control signal input from the user of the telephone apparatus is to be monitored. Then, in step S7, whether or not the remote control signal (the tone signal from the tone key unit) is applied from the telephone circuit 1 is monitored, and this monitoring is repeated in step S8 until the end of the time limit set by the timer or timeout is detected. The remote control signal is applied from the telephone circuit 1 to the remote control signal detecting circuit 14 through the coupling transformer 5 to be detected by the remote control signal detecting circuit 14. When the remote control signal is detected during execution of the step S7, the non-heard incoming message corresponding to the message M1 is reproduced from the incoming message tape 12 in step S9. This may be done by rewinding the incoming message tape 12 to the position of the non-heard incoming message and reproducing the non-heard incoming message from the tape 12 by the same means as that used already for the reproduction of the outgoing message from the outgoing message tape 7. More specifically, a small magnet is mounted on the rotary part of the recording tape reel for the incoming message tape 12, and an electromagnetic sensing means is disposed adjacent to the reel to sense the passing of the small magnet mounted on the reel. The electromagnetic sensing means, such as a reed switch, sensing the number of passings of the small magnet is connected to an up-down counter which counts the number of rotations of the reel. This up-down counter is constructed to count up during recording and reproduction and to count down during rewinding of the incoming message tape 12. A playback position register stores the count of the position of the finally reproduced incoming message. In step S9, rewinding of the incoming message tape 12 is stopped when the count of the updown counter counting down with the rewinding movement of the incoming message tape 12 coincides with the value stored in the playback position register, and the playback mode is immediately started to reproduce the non-heard incoming message from the incoming message tape 12. The count of the up-down counter corresponding to the final recording position is previously stored in a recording position register. The reproduction is stopped when the count corresponding to the final recording position coincides with the count of the counter reproducing the non-heard incoming message, and the value of the count at that time is stored in the playback position register. This completes the step S9 of playback of the non-heard incoming message.

When the result of monitoring in steps S7 and S8 proves that there is no remote control signal input during the predetermined period of time set by the timer, step S10 is executed under control of the control circuit 3. In step S10, data of a message M2 is selected from the ROM 17, and a speech corresponding to the message M2 is synthesized and announced in a manner as described already with reference to the steps S3, S4, S5 and S6. The message M2 contains an expression, "Playback all messages?", which is a question asking the user of the telephone apparatus as to whether or not the function of reproducing all of the incoming messages transmitted and recorded already is to be executed. Then, in step S11, the same manner of processing as that executed in the steps S7 and S8 described already is done to monitor whether or not a remote control signal is applied during the predetermined period of time set by the timer. When the result of monitoring in step S11 proves that a remote control signal is applied during the predetermined period of time, all of the incoming messages corresponding to the message M2 are reproduced from the incoming message tape 12 in step S12. This is done by completely rewinding and reproducing the incoming message tape 12.

On the other hand, when the result of monitoring in step S11 proves that no remote control signal is applied during the predetermined period of time, a message M3 is announced in step S13 in a manner similar to that described already. This message M3 contains an expression, "Change announcement for answer and record?", which is a question asking the user of the telephone apparatus as to whether or not the function of changing or renewing the outgoing message recorded already on the outgoing message tape 7 and recording an incoming message transmitted from a calling party on the incoming message tape 12 after reproduction of the new outgoing message, is to be executed. When the result of monitoring in step S14, in which the manner of processing is similar to that executed in the steps S7 and S8 described already, proves that a remote control signal is applied during the predetermined period of time, step S15 executes processing corresponding to the message M3. The details of the processing executed in step S15 will be described with reference to FIG. 3. In step S31 of FIG. 3, the outgoing message tape 7 is placed in its recording condition under control of the control circuit 3, and a new outgoing message transmitted from the user of the telephone apparatus is recorded on the outgoing message tape 7 through the coupling transformer 5, recording amplifier 13, recording/reproducing switch 8 and recording/reproducing head 9. The recording condition is maintained until the detection of the aluminum foil for a retrieval signal, which occurs after one complete turn of the endless outgoing message tape 7. In step S32, whether or not the recording of the new outgoing message is completed is detected by the aluminum foil. When the result of detection in step S32 proves that the recording is completed, an incoming message recording flag indicative of the fact that an incoming message can now be recorded on the incoming message tape 12 is set to complete the operation.

On the other hand, when the result of monitoring in step S14 proves that no remote control signal is applied during the predetermined period of time, a message M4 is announced in step S16 in a manner similar to that described already. This message M4 contains an expression, "Change announcement for answer only?", which is an oral question asking the user of the telephone apparatus as to whether or not the function of changing or renewing the outgoing message recorded already on the outgoing message tape 7 and inhibiting recording of an incoming message on the incoming message tape 12, is to be executed. When the result of monitoring in step S17, in which the manner of processing is similar to that executed in the steps S7 and S8 described already, proves that a remote control signal is applied during the predetermined period of time, step S18 executes processing corresponding to the message M4. The details of the processing executed in step S18 will be described with reference to FIG. 4. Steps S41 and S42 in FIG. 4 are similar to the steps S31 and S32 in FIG. 3 respectively. In step S43, the incoming message recording flag is reset to inhibit the recording operation of the incoming message tape 12 thereby completing the operation. The operation is similarly ended when the result of monitoring in step S17 proves that no remote control signal is applied.

Figure 3:
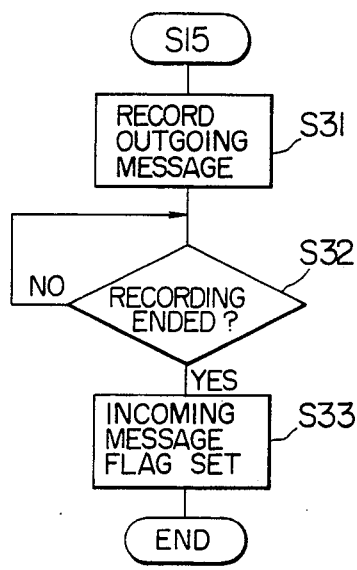
FIGS. 3 and 4 are flow charts showing details of the steps S15 and S18 respectively in the flow chart shown in FIG. 1.
Figure 4:
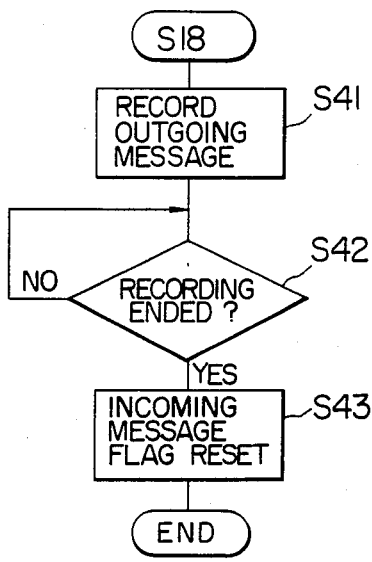
Figure 5:
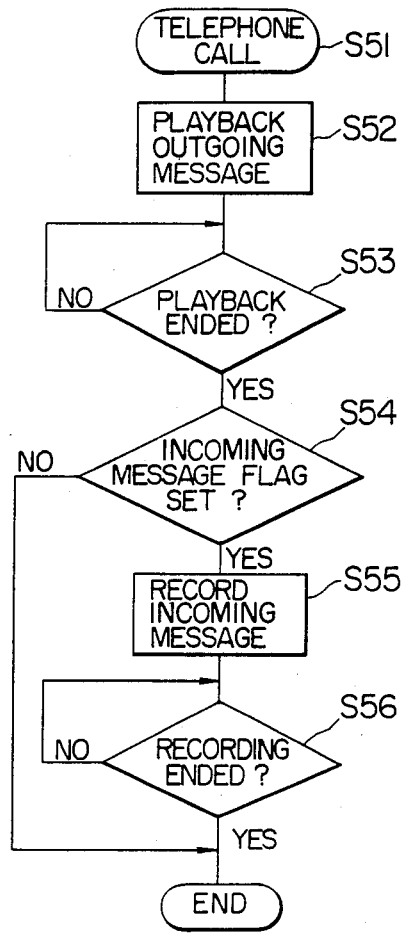
FIG. 5 is a flow chart showing the steps executed after the steps shown in FIGS. 3 or 4.

FIG. 5 illustrates the operation of the system when a third party makes a telephone call after the processing shown in FIGS. 3 or 4. In step S51, such a telephone call is detected by the ringing tone signal detecting circuit 2, and, in step S52, the outgoing message tape 7 is driven for reproduction. In step S53, whether or not the playback of the tape 7 is completed is detected. When the result of detection in step S53 proves that the playback is completed, judgment is made in step S54 as to whether or not the incoming message recording flag is set. Since the setting of the incoming message recording flag indicates that the processing shown in FIG. 3 has been completed, step S55 is executed in which the incoming message tape 12 is driven for recording of the incoming message from the calling third party, and the switch 8 is switched over to the recording position. In step S56, judgment is made as to whether or not the recording is completed, and the operation is ended when the result of judgment in step S56 proves that the recording is completed. On the other hand, when the result of judgment in step S54 proves that the incoming message recording flag is not set, this indicates the fact that the processing shown in FIG. 4 has been completed. Therefore, the operation of the system is ended without recording the incoming message.

Thus, the user of the telephone apparatus makes a dialogue with the telephone apparatus when he wants to select one of a plurality of functions. The dialogue is such that the user sends out a remote control signal when he desires a function corresponding to a question issued from the telephone apparatus, while the user remains silent and waits for the next question when he does not desire the former function, so that the desired function can be specified.

According to the present invention, a plurality of functions can be selectively performed by manipulation of a single button answering "YES" for a given question, even when a portable oscillator called a tone key unit is used for the selection of the functions. Therefore, the present invention can obviate the defects such as the complexity of manipulation and the bulkiness of the tone key unit attributable to an increase in the number of buttons. The above embodiment employs the tone key unit as response means to questions, but according to this invention it is possible to make a response to the questions by human voice. In this case, the remote control signal detecting circuit 14 is adapted to detect an amplitude of an incoming voice signal. In the case, the user of the telephone apparatus is required only to make an oral response to a question or remain silent for the question in the case of control with voice, and the manipulatability of the remote control can be greatly improved. Further the checking or identifying means can be designed as a tone key unit.

Although an embodiment of the present invention applied to an automatic answering telephone apparatus has been described by way of example, the present invention is in no way limited to such a specific embodiment and is widely applicable to all of the fields in which a plurality of functions are alternatively selected and executed under remote control.

We claim:

1. A remote control system for effecting selective execution by remote control of any one of a plurality of functions of an apparatus connected to a communication line of the type permitting bidirectional communications comprising:

first means for sequentially generating a plurality of voice signals representing questioning speeches each relating to respective ones of said functions of said apparatus and for transmitting said signals to a calling party over said communication line;

second means for placing said first means in a stand-by-state for only a predetermined period of time to wait for arrival of a remote control signal transmitted from said calling party after transmission of each of said signals representing said questioning speeches and for automatically enabling said first means after expiration of said predetermined period of time to cause said first means to generate the next voice signal;

third means for detecting transmission of a common remote control signal on said communication line from said calling party in response to any signal representing one of said functions transmitted to said calling party from said first means; and fourth means for executing said one function when said remote control signal responding to said signal representing said one function is detected by said third means.

2. A remote control system as claimed in claim 1, wherein said communication line permitting bidirectional communications is a telephone line.

3. A remote control system as claimed in claim 1, wherein said first means includes a read-only memory storing message information data relating to said questioning speeches corresponding to said respective functions of said apparatus, address circuit means for selectively reading out said message information data in a predetermined sequence, and speech synthesis means for generating signals representing said speeches from said message information data read out from said read-only memory by said address circuit means.

4. A remote control system as claimed in claim 1, wherein said second means includes timer means timing the predetermined period of time, said timer means being actuated after transmission of each of said signals representing questioning speeches.

5. A remote control system for effecting selective execution of any one of a plurality of functions of an apparatus by remote control over a telephone line comprising:

first means for reproducing a pre-recorded outgoing message and for transmitting said message to a calling party on said telephone line when a communication request is received over said telephone line from said calling party;

recording means for recording an incoming message transmitted from said calling party on said telephone line after transmission of said outgoing message;

second means for checking to identify whether said calling party is authorized to use said apparatus;

third means for sequentially generating voice signals representing questioning speeches each relating to respective ones of said functions of said apparatus and for transmitting said signals to said calling party over said telephone line when said calling party is identified as being authorized to use said apparatus;

stand-by means for placing said third means in a stand-by state for a predetermined period of time to wait for arrival of a remote control signal from said calling party after transmission of each of said signals representing said questioning speeches;

detecting means for detecting transmission of a remote control signal on said telephone line from said calling party in response to a signal representing one of said functions transmitted to said calling party from said third means; and fourth means for executing said one function when said remote control signal responding to said signal representing said one function is detected by said detecting means.

6. A remote control system as claimed in claim 5, wherein said apparatus includes playback means for reproducing an incoming message recorded by said incoming message recording means and for transmitting it to a calling party in response to said detecting means detecting a remote control signal on said telephone line responding to a transmitted signal representing a first one of said questioning speeches.

7. A remote control system as claimed in claim 5, wherein said apparatus includes playback means for reproducing a selected incoming message of plural messages recorded by said recording means and for transmitting said selected message to a calling party in response to said detecting means detecting a remote control signal on said telephone line responding to a transmitted signal representing a second one of said questioning speeches.

8. A remote control system as claimed in claim 5, wherein said apparatus includes means for changing said outgoing message by recording on said first means a new outgoing message transmitted on said telephone line from a calling party in response to said detecting means detecting a remote control signal on said telephone line responding to a transmitted signal representing a third one of said questioning speeches.

9. A remote control system as claimed in claim 8, wherein said outgoing message changing means further includes means for storing an indication as to whether or not said recording means is to record an incoming message.

* * * * *